United States Patent
Liebschutz et al.

(10) Patent No.: US 11,047,253 B2
(45) Date of Patent: Jun. 29, 2021

(54) MODEL-BASED ROTOR SPEED KEEP OUT ZONE CONTROL

(71) Applicant: United Technologies Corporation, Farmington, CT (US)

(72) Inventors: Robert Liebschutz, Delray Beach, FL (US); Matthew Donald, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 198 days.

(21) Appl. No.: 16/402,579

(22) Filed: May 3, 2019

(65) Prior Publication Data
US 2020/0347745 A1    Nov. 5, 2020

(51) Int. Cl.
*F01D 17/00*    (2006.01)

(52) U.S. Cl.
CPC .......... *F01D 17/00* (2013.01); *F05D 2220/32* (2013.01); *F05D 2270/023* (2013.01); *F05D 2270/11* (2013.01); *F05D 2270/44* (2013.01)

(58) Field of Classification Search
CPC ...... F04D 27/00; F04D 27/002; F04D 27/003; F04D 27/004; F04D 27/009; F01D 17/00; F05D 2220/32; F05D 2270/023; F05D 2270/11; F05D 2270/44
See application file for complete search history.

(56) References Cited

U.S. PATENT DOCUMENTS

| | | |
|---|---|---|
| 5,379,583 A | 1/1995 | Zickwolf, Jr. |
| 8,720,258 B2 | 5/2014 | Meisner et al. |
| 9,494,085 B2 | 11/2016 | Cai |
| 9,732,625 B2 | 8/2017 | Cai |
| 10,113,487 B2 | 10/2018 | Cai et al. |
| 10,316,760 B2 * | 6/2019 | Meisner ............. F02C 9/52 |
| 2016/0069277 A1 | 3/2016 | Meisner et al. |

FOREIGN PATENT DOCUMENTS

| | | |
|---|---|---|
| EP | 2952710 A1 | 12/2015 |
| EP | 3059424 A1 | 8/2016 |

OTHER PUBLICATIONS

EP Application No. 20172624.7 Extended EP Search Report dated Oct. 2, 2020, 5 pages.

* cited by examiner

*Primary Examiner* — Richard A Edgar
(74) *Attorney, Agent, or Firm* — Cantor Colburn LLP

(57) ABSTRACT

A system for keep out zone control includes a gas turbine engine and a controller operable to determine a closing threshold with respect to an upper limit and an opening threshold with respect to a lower limit of a movement range of an effector of the gas turbine engine based on an on-board model, where the upper limit and the lower limit define a keep out zone of a target parameter of the gas turbine engine. The controller determines a projected state of the target parameter absent a correction command to the effector, applies a closing correction to the effector based on determining that the projected state of the target parameter would result in being above the closing threshold, and applies an opening correction to the effector based on determining that the projected state of the target parameter would result in being below the opening threshold.

20 Claims, 4 Drawing Sheets

MODEL-BASED ROTOR SPEED KEEP OUT ZONE CONTROL

BACKGROUND

The subject matter disclosed herein generally relates to rotating machinery and, more particularly, to a method and an apparatus for model-based rotor speed keep out zone control for a gas turbine engine.

Gas turbine engines typically include multiple spools or rotors that connect compressor sections with turbine sections. For example, in a two-spool configuration, a low spool can include a rotor with low pressure compressor and low pressure turbine sections, and a high spool can include a rotor with high pressure compressor and high pressure turbine sections. Gas turbine engine controls typically attempt to control the speed of the low spool responsive to a command, such as a pilot thrust control. As the low spool speed is adjusted to meet the command, the high spool speed "floats" relative to the low spool speed. For example, as the low spool speed increases due to increased fuel consumption, the high spool speed also increases in response to the increased fuel consumption. The corresponding speed of the high spool may not be directly controlled but has known relationships relative the low spool speed and other operating parameters.

As the low and high spool speeds change, there may be speed ranges in which engine components experience increased wear. Dwelling in speed ranges that are known to exacerbate wear may reduce engine component life.

BRIEF DESCRIPTION

According to one embodiment, a system for keep out zone control includes a gas turbine engine including at least one compressor section and at least one turbine section operably coupled to a shaft of a spool. The system also includes a controller is operable to determine a closing threshold with respect to an upper limit and an opening threshold with respect to a lower limit of a movement range of an effector of the gas turbine engine based on an on-board model, where the upper limit and the lower limit define a keep out zone of a target parameter of the gas turbine engine. The controller is also operable to determine a projected state of the target parameter of the gas turbine engine absent a correction command to the effector, apply a closing correction to the effector as the correction command based on determining that the projected state of the target parameter of the gas turbine engine would result in being above the closing threshold, and apply an opening correction to the effector as the correction command based on determining that the projected state of the target parameter of the gas turbine engine would result in being below the opening threshold.

In addition to one or more of the features described above or below, or as an alternative, further embodiments may include where the closing threshold and the opening threshold define a switch hysteresis band, and the upper limit and the lower limit define a keep out zone width with respect to the target parameter of the gas turbine engine.

In addition to one or more of the features described above or below, or as an alternative, further embodiments may include where the spool is a high speed spool, and the gas turbine engine further includes a low speed spool, where the low speed spool includes a low pressure compressor section and a low pressure turbine section.

In addition to one or more of the features described above or below, or as an alternative, further embodiments may include where the target parameter is a speed of the high speed spool, and the effector is a high pressure compressor stator vane actuator.

In addition to one or more of the features described above or below, or as an alternative, further embodiments may include where the controller is further configured to select between the closing correction and the opening correction based on comparing the projected state of the target parameter with the closing threshold and the opening threshold to determine the correction command, and add the correction command to a high pressure compressor stator vane schedule to control a position of a plurality of high pressure compressor stator vanes using the high pressure compressor stator vane actuator.

In addition to one or more of the features described above or below, or as an alternative, further embodiments may include where the correction command is rate limited, and the closing correction and the opening correction are range limited.

In addition to one or more of the features described above or below, or as an alternative, further embodiments may include where the controller is further configured to determine an adder authority as an adder value to define the upper limit and the lower limit based on at least one speed and at least one vane angle of the gas turbine engine, and split the adder value between an opening direction and a closing direction of the effector.

In addition to one or more of the features described above or below, or as an alternative, further embodiments may include where the closing threshold and the opening threshold are determined with respect to the adder value, a change rate of the at least one speed, and a change rate of the at least one vane angle.

In addition to one or more of the features described above or below, or as an alternative, further embodiments may include where the projected state of the target parameter is determined based on a value of the at least one speed, the adder value, the change rate of the at least one speed, and the change rate of the at least one vane angle.

In addition to one or more of the features described above or below, or as an alternative, further embodiments may include where the controller is further configured to apply a closing keep out zone proportional-integral control to the target parameter with respect to the upper limit to determine the closing correction, and apply an opening keep out zone proportional-integral control to the target parameter with respect to the lower limit to determine the opening correction.

According to an embodiment, a method for keep out zone control in a gas turbine engine includes determining a closing threshold with respect to an upper limit and an opening threshold with respect to a lower limit of a movement range of an effector of the gas turbine engine based on an on-board model, wherein the upper limit and the lower limit define a keep out zone of a target parameter of the gas turbine engine, determining a projected state of the target parameter of the gas turbine engine absent a correction command to the effector, applying a closing correction to the effector as the correction command based on determining that the projected state of the target parameter of the gas turbine engine would result in being above the closing threshold, and applying an opening correction to the effector as the correction command based on determining that the projected state of the target parameter of the gas turbine engine would result in being below the opening threshold.

In addition to one or more of the features described above or below, or as an alternative, further embodiments may include selecting between the closing correction and the opening correction based on comparing the projected state of the target parameter with the closing threshold and the opening threshold to determine the correction command, and adding the correction command to a high pressure compressor stator vane schedule to control a position of a plurality of high pressure compressor stator vanes using the high pressure compressor stator vane actuator.

In addition to one or more of the features described above or below, or as an alternative, further embodiments may include determining an adder authority as an adder value to define the upper limit and the lower limit based on at least one speed and at least one vane angle of the gas turbine engine, and splitting the adder value between an opening direction and a closing direction of the effector.

In addition to one or more of the features described above or below, or as an alternative, further embodiments may include applying a closing keep out zone proportional-integral control to the target parameter with respect to the upper limit to determine the closing correction, and applying an opening keep out zone proportional-integral control to the target parameter with respect to the lower limit to determine the opening correction.

A technical effect of the apparatus, systems and methods is achieved by performing model-based rotor speed keep out zone control for a gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
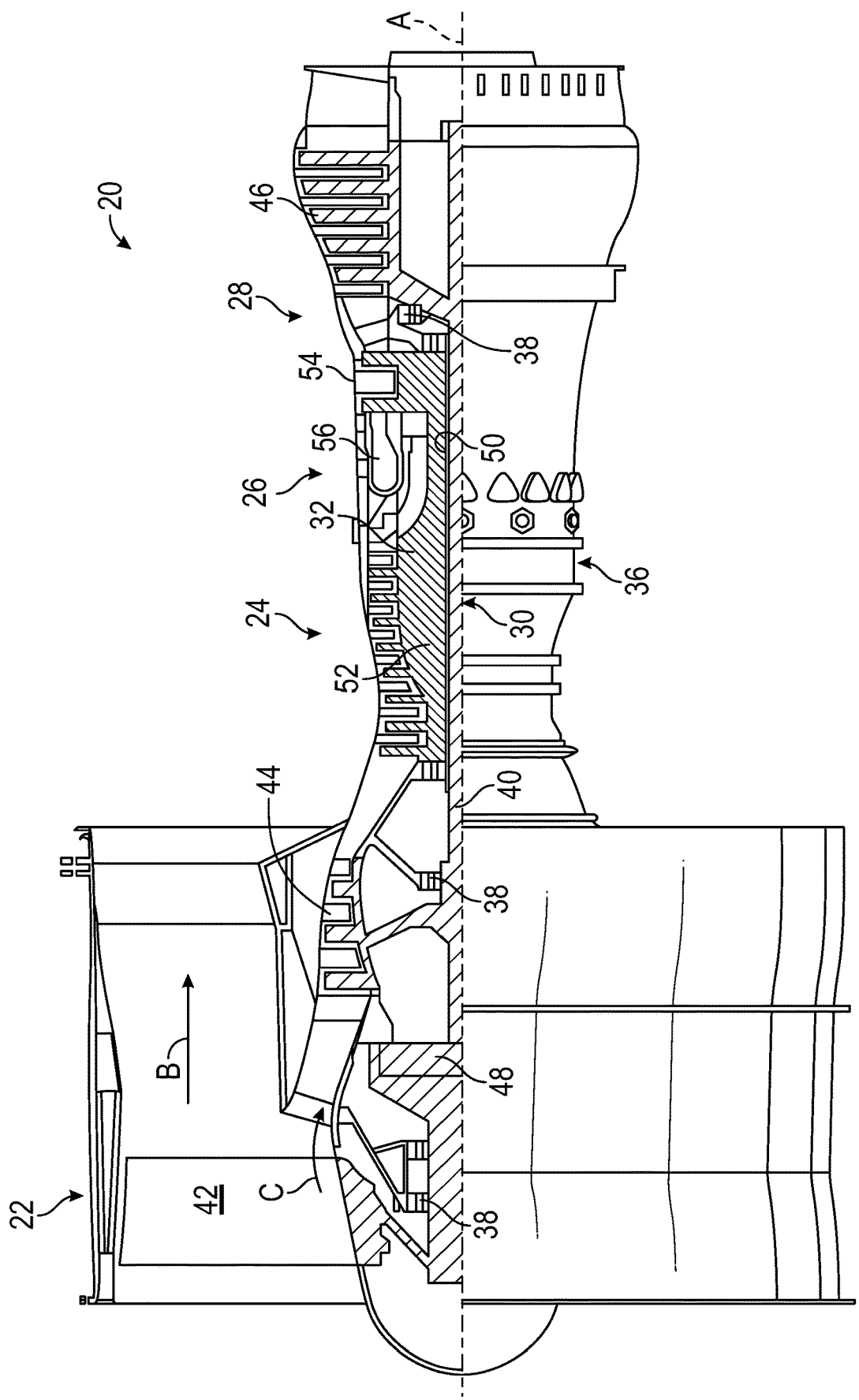
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
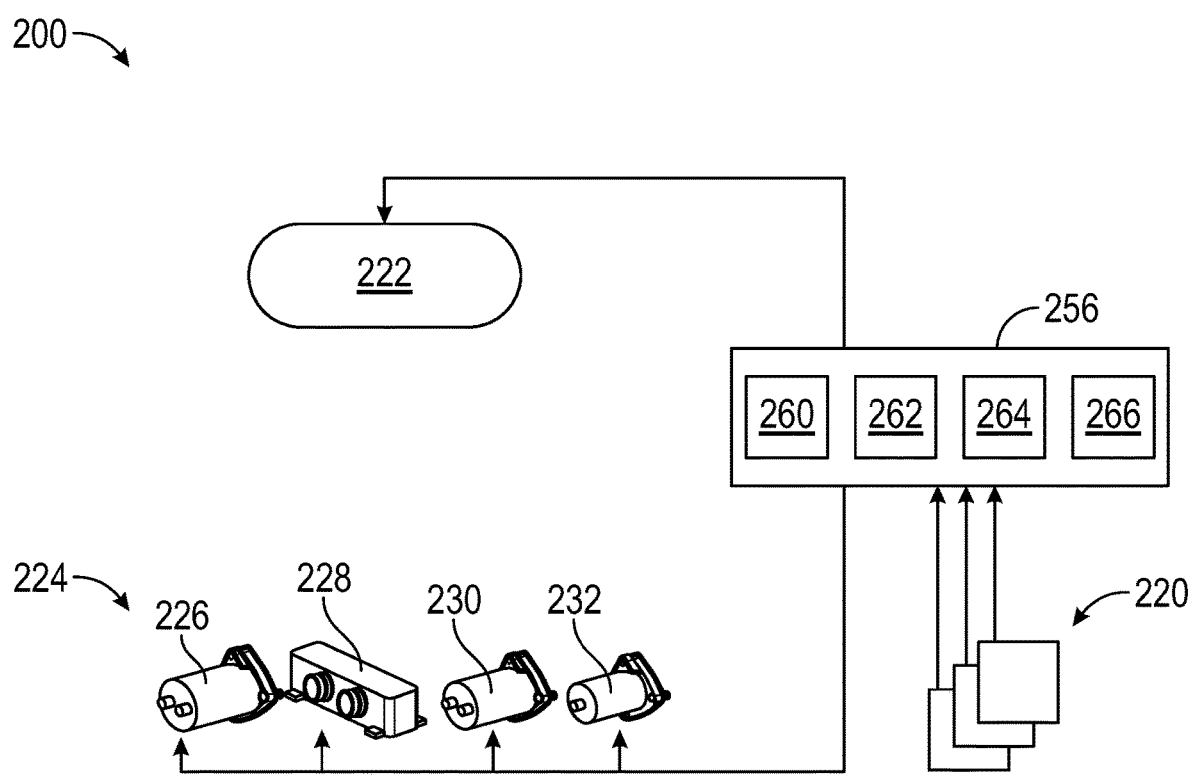
FIG. 2 is a schematic diagram of a control system of a gas turbine engine, in accordance with an embodiment of the disclosure.

FIG. 2 illustrates a control system 200 of the gas turbine engine 20 of FIG. 1. The control system 200 includes a plurality of sensors 220, such as speed sensors, temperature sensors, strain sensors, pressure sensors, and other sensor types known in the art that can be distributed throughout the gas turbine engine 20. A fuel control unit 222 can meter the flow of fuel to the combustor 56 of FIG. 1 to increase or decrease the speed of the low speed spool 30 and the high speed spool 32 of FIG. 1. The control system 200 also includes a plurality of effectors 224, such as one or more of a low pressure compressor bleed valve actuator 226, a low pressure compressor stator vane actuator 228, a high pressure compressor stator vane actuator 230, an active clearance control actuator 232, and other such effectors.

A controller 256 can interface with the sensors 220, fuel control unit 222, effectors 224, and/or other components (not depicted) of the gas turbine engine 20 of FIG. 1. In embodiments, the controller 256 can control and monitor for fault conditions of the gas turbine engine 20. For example, the controller 256 can be a full authority digital engine control (FADEC) of the gas turbine engine 20. In embodiments, the controller 256 can include a processing system 260, a memory system 262, and an input/output interface 264. The controller 256 can also include various operational controls, such as a model-based keep out zone control 266 that controls one or more of the effectors 224 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the sensors 220 and interface with various components and subsystems, such as components of the fuel control unit 222, effectors 224, and/or other components (not depicted) of the gas turbine engine 20. The controller 256 provides a means for controlling the effectors 224 based on the model-based keep out zone control 266 that is dynamically updated during operation of the gas turbine engine 20 of FIG. 1. The means for controlling the effectors 224 can be otherwise subdivided, distributed, or combined with other control elements.

Figure 3:
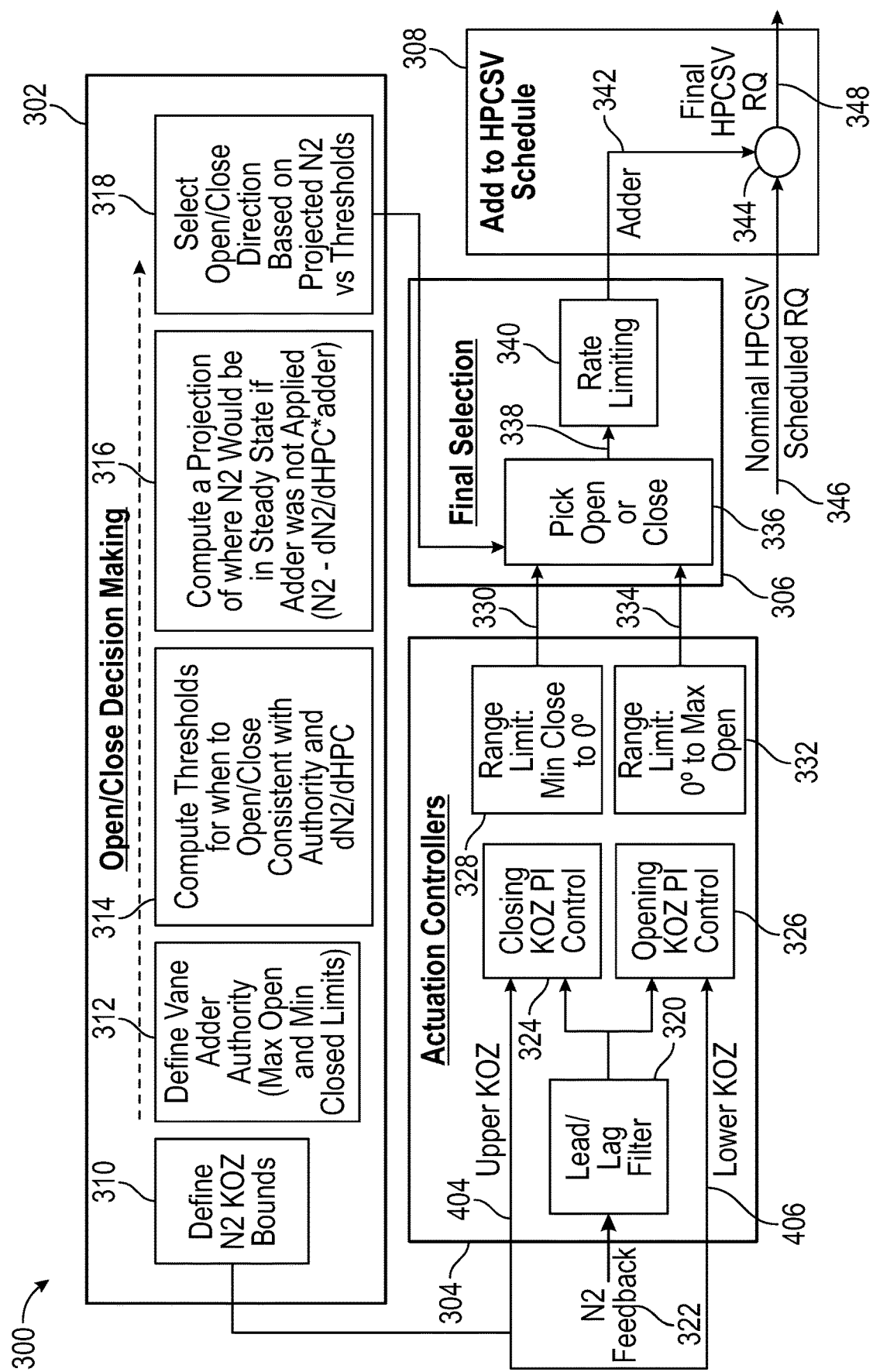
FIG. 3 is a block diagram of a model-based controller for rotor speed keep out zone control, in accordance with an embodiment of the disclosure.

Referring now to FIG. 3, a block diagram of a model-based controller 300 is depicted, in accordance with an embodiment of the disclosure. The model-based controller 300 is an example of the model-based keep out zone control 266 and may be incorporated in the controller 256 of FIG. 2. The model-based controller 300 can include an open/close decision making logic 302, actuation controllers 304, final selection logic 306, and add control adjustments to nominal effector schedules 308. The example of FIG. 3 is described with respect to rotor speed (N2) of the high speed spool 32 as a target parameter of the gas turbine engine 20 of FIG. 1 and the high pressure compressor stator vane actuator 230 of FIG. 2 as an effector 224 to control; however, it will be understood that embodiments can apply to a variety of target parameters and effectors 224 of the gas turbine engine 20 depending on the need to establish keep out zones.

The open/close decision making logic 302 can define N2 keep out zone bounds at block 310, define vane adder authority at block 312, compute thresholds for when to open/close high pressure compressor stator vanes driven by the high pressure compressor stator vane actuator 230 at block 314, compute a projected state of N2 in steady state that represents what sensed N2 would be absent a correction command to the high pressure compressor stator vane actuator 230 at block 316, and select the open/close direction based on the projected state of N2 versus thresholds at block 318. The keep out zone bounds and thresholds are illustrated in chart 400 of FIG. 4 as an example for purposes of explanation. A threshold to switch 402 between opening and closing of the high pressure compressor stator vane actuator 230 can be defined in terms of N2 values, for instance, at about half way between an upper limit 404 and a lower limit 406 that define a keep out zone as N2 speeds to avoid or minimize time in range. The upper limit 404 and lower limit 406 form a keep out zone width 408, where the high pressure compressor stator vane actuator 230 can either be adjusted to be more opened or more closed than currently scheduled to shift the N2 speed higher or lower outside of the keep out zone. Hysteresis 410 can be added around the threshold to switch 402 to avoid potential limit cycling. The decision to switch directions between opening and closing is made based on the projected N2 (block 316) crossing a closing threshold 412 or an opening threshold 414. Further embodiments can have alternate control laws with different design goals. For example, embodiments can minimize time in a keep out zone (or set of keep out zones) while also minimizing the control adder size to reduce changes to the nominal effector schedule. This alternate approach can be performed by using model-based control information to set open\close thresholds and to define an accurate projected target parameter to minimize activity. Model-based keep out zone control can prevent limit cycling in and out of a keep out zone using a projected target parameter, for instance, by knowing more precisely what the target parameter would be without correction.

The closing threshold 412 for N2 can be defined as $\delta_C \times \partial N2/\partial HPC$ where $\delta_C$ is a movement change in the closing direction and $\partial N2/\partial HPC$ is a model-based partial derivative (k) that relates a change in N2 to a change in vane angle of the high pressure compressor 52 of FIG. 1. The opening threshold 414 for N2 can be defined as $\delta_O \times \partial N2/$ ∂HPC, where $\delta_O$ is a movement change in the opening direction. The adder authority of block 312 of FIG. 3 can be represented as $\delta_{ADDER} = \delta_C + \delta_O$, where the adder splits authority between closing and opening directions. As one example using a model-based partial derivative, the adder can be computed as the keep out zone width 408 plus hysteresis 410 divided by k, which can be expressed as:

$$\partial N2/\partial HPC = k \text{ and } \delta_{ADDER} = \frac{(KOZ \text{ Width} + Hyst)}{k}.$$

As another example, model lookup of variables can be used, where k can be determined as a function of a corrected N1 speed (n1c2) of the low speed spool 30 of FIG. 1 and a pressure ratio of P2 divided by P ambient, which can be expressed as: $\partial N2/\partial HPC = f(n1c2, P_2/P_{AMB})$. Using a lookup relative to ith and jth table entries, the adder can be expressed as $$\delta_{ADDER} = \frac{(KOZ \text{ Width} + Hyst)}{(\partial N2/\partial HPC)_{i,j}}.$$

Alternatively, a lookup function can be based on corrected N2 to a T25 station value of N2C25. Embodiments can use model information to allow control of a secondary effector (e.g., vane control rather than fuel control) to affect a target parameter, such as N2, with negligible disruption to thrust.

Figure 4:
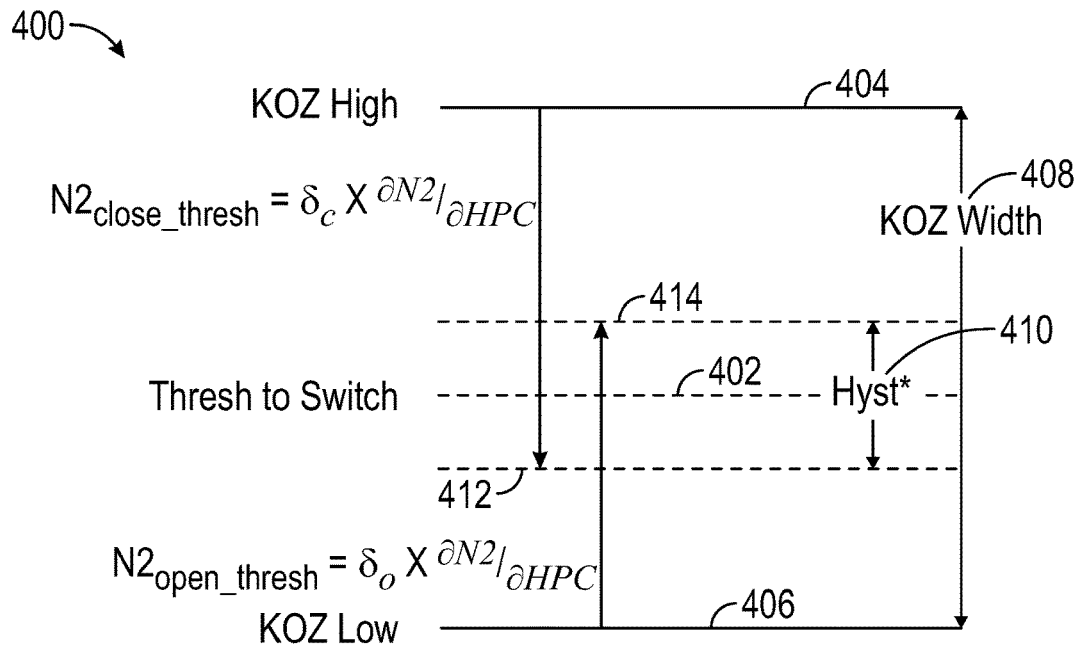
FIG. 4 is a chart illustrating control system thresholds, in accordance with an embodiment of the disclosure.

Returning to FIG. 3 and with continued reference to FIG. 4, block 310 can define the upper limit 404 and lower limit 406 to bound N2 relative to keep out zone width 408. Block 312 can compute the adder authority as $\delta_{ADDER}$. Block 314 can define the closing threshold 412 and opening threshold 414 consistent with the adder authority and k. Block 316 can determine the projected state of N2 as $N2-k*\delta_{ADDER}$. The actuation controller 304 can include a lead/lag filter 320 to filter a value of N2 feedback 322, which can be a sensed value of N2. Further, the lead/lag filter 320 may be omitted in embodiments. An N2 value (e.g., a filtered or unfiltered version of N2 feedback 322) can be passed to a closing keep out zone proportional-integral control 324 and an opening keep out zone proportional-integral control 326. Block 310 can provide upper limit 404 to the closing keep out zone proportional-integral control 324 and lower limit 406 to the opening keep out zone proportional-integral control 326. The actuation controllers 304 can apply the closing keep out zone proportional-integral control 324 to N2 feedback 322 with respect to the upper limit 404 and a range limit 328 to determine a closing correction 330. The actuation controllers 304 can also apply the opening keep out zone proportional-integral control 326 to the N2 feedback 322 with respect to the lower limit 406 and a range limit 332 to determine an opening correction 334.

The final selection logic 306 can include a multiplexer 336 to select between the closing correction 330 and the opening correction 334 based on a flag value set by block 318 to produce a correction command 338 that can be further constrained by rate limiting 340 to prevent larger step changes. The output of the rate limiting 340 is an adder value 342 that can be combined at summing junction 344 with a high pressure compressor stator vane schedule 346 to produce a high pressure compressor stator vane request 348 to control a position of a plurality of high pressure compressor stator vanes using the high pressure compressor stator vane actuator 230 of FIG. 2.

Figure 5:
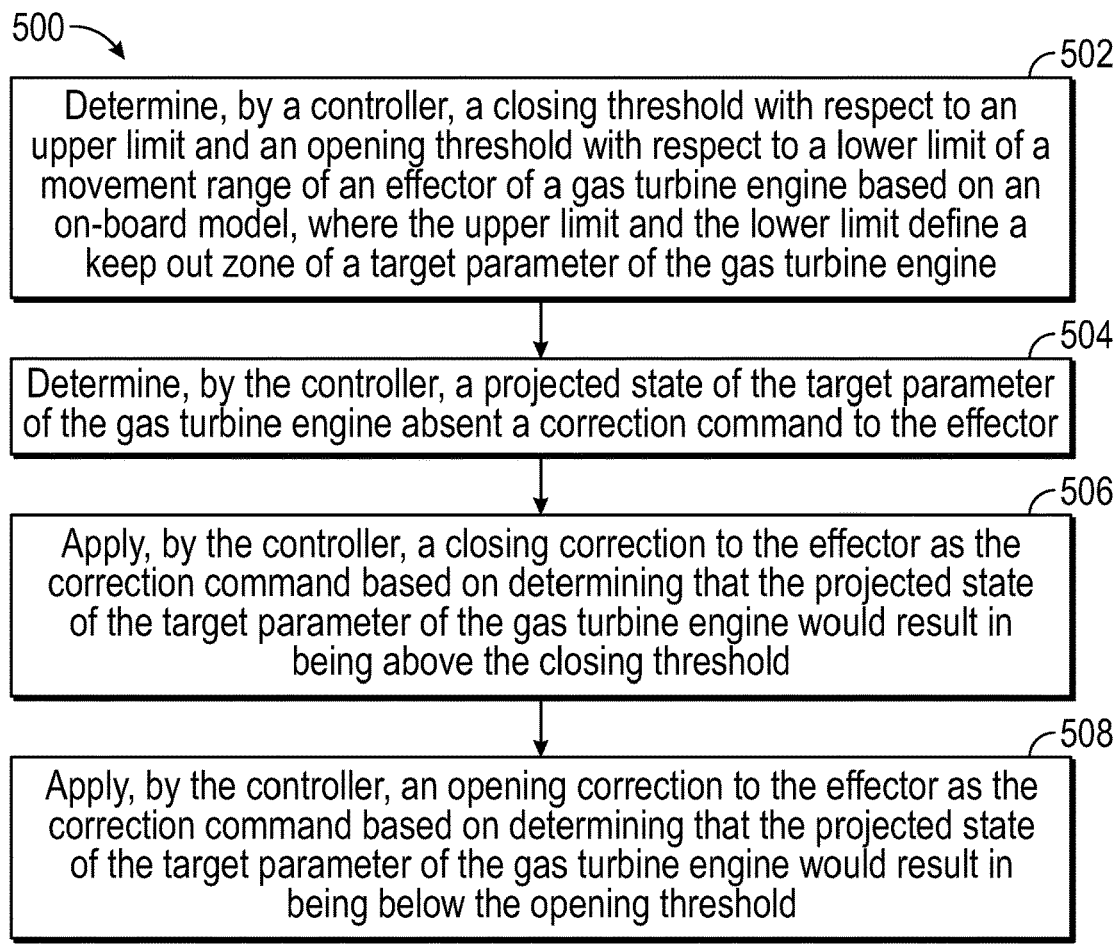
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for keep out zone control, in accordance with an embodiment. The method 500 may be performed, for example, by the control system 200 of FIG. 2. For purposes of explanation, the method 500 is described primarily with respect to the control system 200 of FIG. 2; however, it will be understood that the method 500 can be performed on other configurations (not depicted). The method 500 can be applied for a spool, such as the high speed spool 32, where primary speed control of the gas turbine engine 20 is performed with respect to the low speed spool 30 and secondary control of the high speed spool 32 is constrained by commands targeting performance of the low speed spool 30.

At block 502, the controller 256 can determine a closing threshold 412 with respect to an upper limit 404 and an opening threshold 414 with respect to a lower limit 406 of a movement range of an effector of the gas turbine engine 20 based on an on-board model as part of the model-based keep out zone control 266, where the upper limit 404 and the lower limit 406 define a keep out zone of a target parameter of the gas turbine engine 20. The effector can be a high pressure compressor stator vane actuator 230 and the target parameter can be N2, as an example. At block 504, the controller 256 can determine a projected state of the target parameter of the gas turbine engine 20 absent application of a correction command 338 to the effector. For example, when the adder value 342 is nonzero and the design is active, block 316 can project a state of N2 in steady state if the adder value 342 was zero to predict N2 without the effect of applying the actuation controllers 304. The controller 256 can apply a closing keep out zone proportional-integral control 324 to the target parameter (which may be filtered) with respect to the upper limit 404 to determine the closing correction 330. The controller 256 can apply an opening keep out zone proportional-integral control 326 to the target parameter with respect to the lower limit 406 to determine the opening correction 334.

At block 506, the controller 256 can apply a closing correction 330 to the effector as the correction command 338 based on determining that the projected state of the target parameter of the gas turbine engine 20 would result in being above the closing threshold 412. At block 508, the controller 256 can apply an opening correction 334 to the effector as the correction command 338 based on determining that the projected state of the target parameter of the gas turbine engine 20 would result in being below the opening threshold 414. The closing threshold 412 and the opening threshold 414 can define a switch hysteresis band 410, and the upper limit 404 and the lower limit 406 can define a keep out zone width 408 with respect to the target parameter of the gas turbine engine 20.

The controller 256 can select between the closing correction 330 and the opening correction 334 based on comparing the projected state of the target parameter with the closing threshold 412 and the opening threshold 414 to determine the correction command 338. The correction command 338 can be added to a high pressure compressor stator vane schedule 346 to control a position of a plurality of high pressure compressor stator vanes using the high pressure compressor stator vane actuator 230. The correction command 338 can be rate limited by rate limiting 340, and the closing correction 330 and the opening correction 334 can be range limited by range limits 328, 332. The controller 256 can determine an adder authority to define the upper limit 404 and the lower limit 406 based on at least one speed and at least one vane angle of the gas turbine engine 20. The adder authority, which is how much the effector can change the target, can be split between an opening direction and a closing direction of the effector as adder value 342. The closing threshold 412 and the opening threshold 414 can be determined with respect to the adder authority, a change rate of the at least one speed (e.g., N2), and a change rate of the at least one vane angle (e.g., of the high pressure compressor 52). The projected state of the target parameter can be determined based on a value of the at least one speed, the adder value 342, the change rate of the at least one speed, and the change rate of the at least one vane angle.

While the above description has described the flow process of FIG. 5 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for keep out zone control comprising:
    a gas turbine engine comprising at least one compressor section and at least one turbine section operably coupled to a shaft of a spool; and
    a controller operable to:
        determine a closing threshold with respect to an upper limit and an opening threshold with respect to a lower limit of a movement range of an effector of the gas turbine engine based on an on-board model, wherein the upper limit and the lower limit define a keep out zone of a target parameter of the gas turbine engine;
        determine a projected state of the target parameter of the gas turbine engine absent a correction command to the effector;
        apply a closing correction to the effector as the correction command based on determining that the projected state of the target parameter of the gas turbine engine would result in being above the closing threshold; and
        apply an opening correction to the effector as the correction command based on determining that the projected state of the target parameter of the gas turbine engine would result in being below the opening threshold.

2. The system of claim 1, wherein the closing threshold and the opening threshold define a switch hysteresis band, and the upper limit and the lower limit define a keep out zone width with respect to the target parameter of the gas turbine engine.

3. The system of claim 1, wherein the spool is a high speed spool, and the gas turbine engine further comprises a low speed spool, wherein the low speed spool comprises a low pressure compressor section and a low pressure turbine section.

4. The system of claim 3, wherein the target parameter is a speed of the high speed spool, and the effector is a high pressure compressor stator vane actuator.

5. The system of claim 4, wherein the controller is further configured to:
    select between the closing correction and the opening correction based on comparing the projected state of the target parameter with the closing threshold and the opening threshold to determine the correction command; and
    add the correction command to a high pressure compressor stator vane schedule to control a position of a plurality of high pressure compressor stator vanes using the high pressure compressor stator vane actuator.

6. The system of claim 5, wherein the correction command is rate limited, and the closing correction and the opening correction are range limited.

7. The system of claim 1, wherein the controller is further configured to:
    determine an adder authority as an adder value to define the upper limit and the lower limit based on at least one speed and at least one vane angle of the gas turbine engine; and
    split the adder value between an opening direction and a closing direction of the effector.

8. The system of claim 7, wherein the closing threshold and the opening threshold are determined with respect to the adder value, a change rate of the at least one speed, and a change rate of the at least one vane angle.

9. The system of claim 8, wherein the projected state of the target parameter is determined based on a value of the at least one speed, the adder value, the change rate of the at least one speed, and the change rate of the at least one vane angle.

10. The system of claim 1, wherein the controller is further configured to:
    apply a closing keep out zone proportional-integral control to the target parameter with respect to the upper limit to determine the closing correction; and
    apply an opening keep out zone proportional-integral control to the target parameter with respect to the lower limit to determine the opening correction.

11. A method for keep out zone control in a gas turbine engine, the method comprising:

determining a closing threshold with respect to an upper limit and an opening threshold with respect to a lower limit of a movement range of an effector of the gas turbine engine based on an on-board model, wherein the upper limit and the lower limit define a keep out zone of a target parameter of the gas turbine engine;

determining a projected state of the target parameter of the gas turbine engine absent a correction command to the effector;

applying a closing correction to the effector as the correction command based on determining that the projected state of the target parameter of the gas turbine engine would result in being above the closing threshold; and applying an opening correction to the effector as the correction command based on determining that the projected state of the target parameter of the gas turbine engine would result in being below the opening threshold.

12. The method of claim 11, wherein the closing threshold and the opening threshold define a switch hysteresis band, and the upper limit and the lower limit define a keep out zone width with respect to the target parameter of the gas turbine engine.

13. The method of claim 11, wherein the gas turbine engine comprises a high speed spool and a low speed spool, the high speed spool comprising at least one compressor section and at least one turbine section operably coupled to a shaft, and the low speed spool comprising a low pressure compressor section and a low pressure turbine section.

14. The method of claim 13, wherein the target parameter is a speed of the high speed spool, and the effector is a high pressure compressor stator vane actuator.

15. The method of claim 14, further comprising:
selecting between the closing correction and the opening correction based on comparing the projected state of the target parameter with the closing threshold and the opening threshold to determine the correction command; and adding the correction command to a high pressure compressor stator vane schedule to control a position of a plurality of high pressure compressor stator vanes using the high pressure compressor stator vane actuator.

16. The method of claim 15, wherein the correction command is rate limited, and the closing correction and the opening correction are range limited.

17. The method of claim 11, further comprising:
determining an adder authority as an adder value to define the upper limit and the lower limit based on at least one speed and at least one vane angle of the gas turbine engine; and splitting the adder value between an opening direction and a closing direction of the effector.

18. The method of claim 17, wherein the closing threshold and the opening threshold are determined with respect to the adder value, a change rate of the at least one speed, and a change rate of the at least one vane angle.

19. The method of claim 18, wherein the projected state of the target parameter is determined based on a value of the at least one speed, the adder value, the change rate of the at least one speed, and the change rate of the at least one vane angle.

20. The method of claim 11, further comprising:
applying a closing keep out zone proportional-integral control to the target parameter with respect to the upper limit to determine the closing correction; and applying an opening keep out zone proportional-integral control to the target parameter with respect to the lower limit to determine the opening correction.

* * * * *